Figure 3:
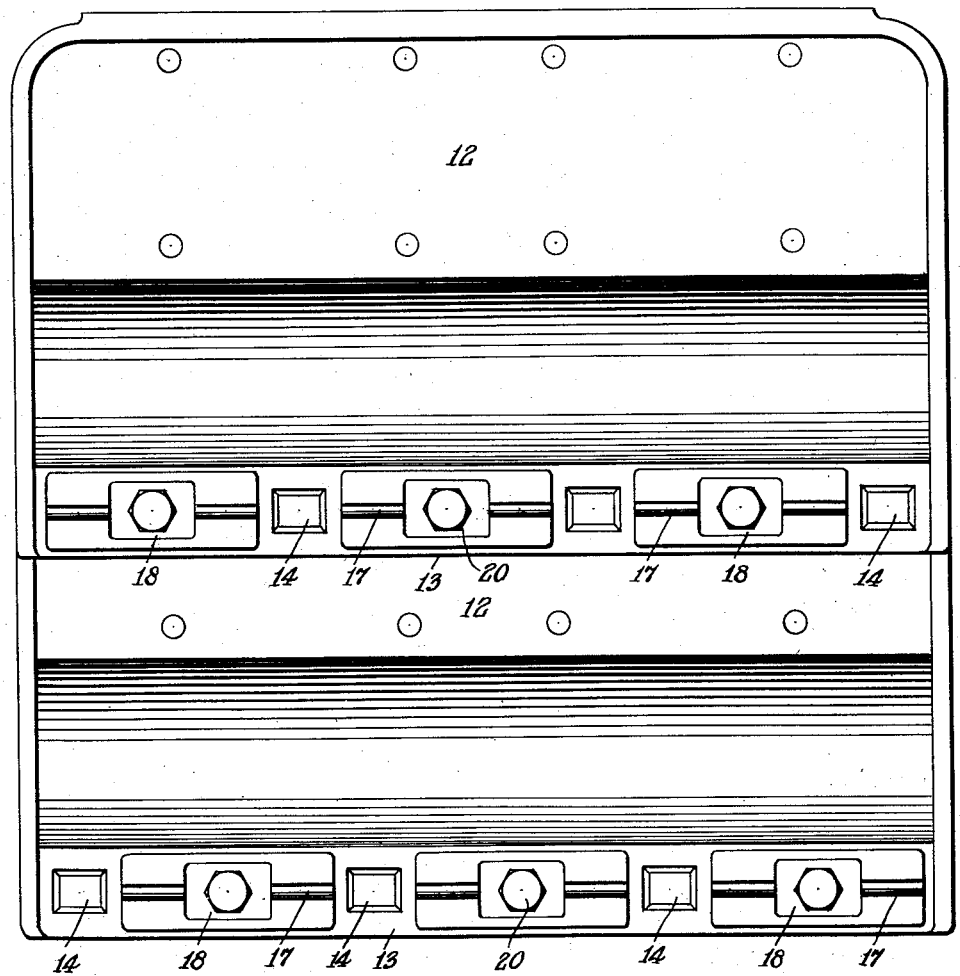

April 21, 1931. W. H. BOSWORTH 1,802,106
CONVEYER BUCKET
Filed Jan. 2, 1930   2 Sheets-Sheet 1
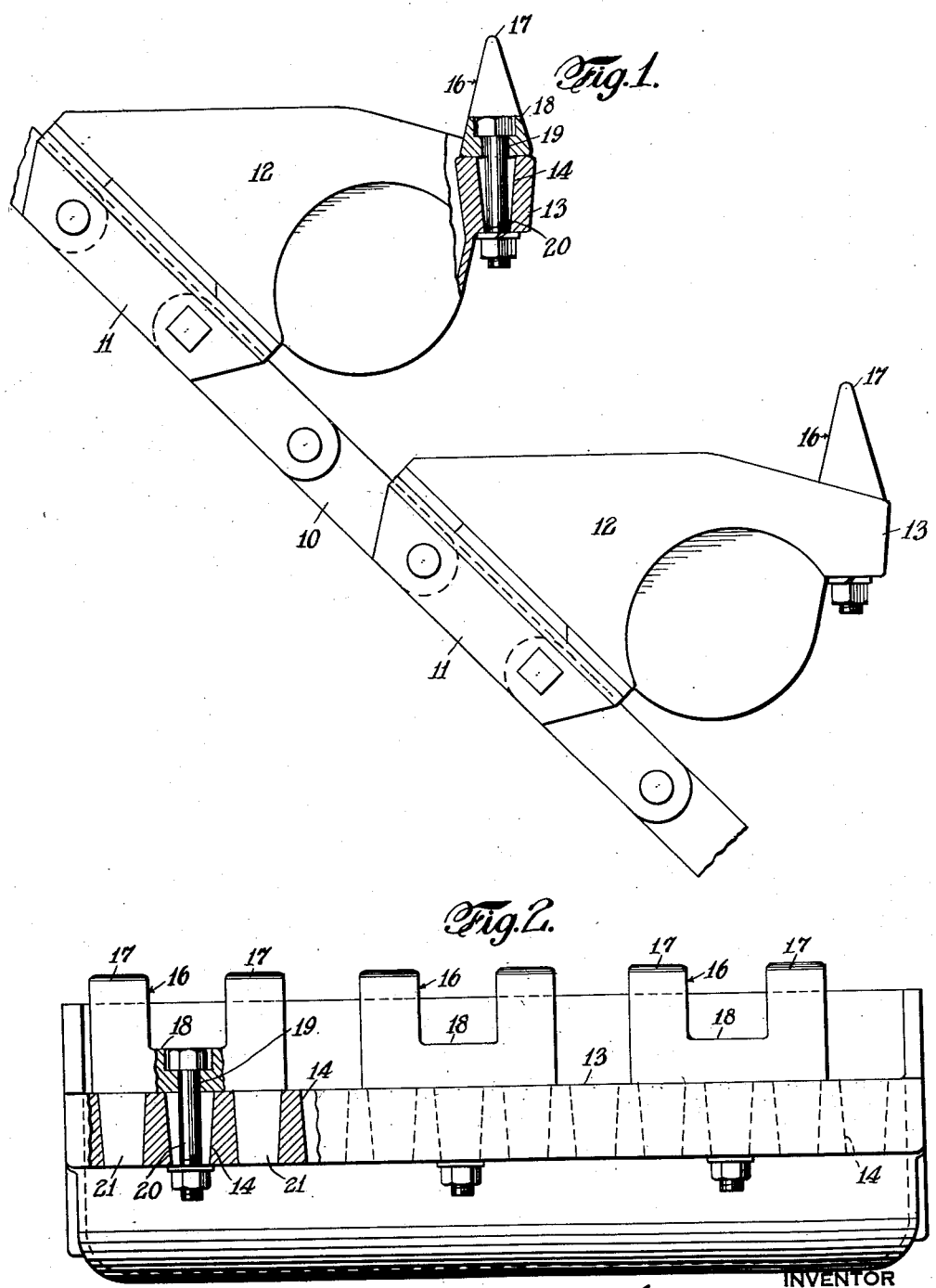

April 21, 1931.  W. H. BOSWORTH  1,802,106
CONVEYER BUCKET
Filed Jan. 2, 1930   2 Sheets-Sheet 2

Patented Apr. 21, 1931

1,802,106

UNITED STATES PATENT OFFICE

WILLIAM H. BOSWORTH, OF YONKERS, NEW YORK, ASSIGNOR TO GEORGE HAISS MANUFACTURING CO. INC., OF NEW YORK, N. Y., A CORPORATION OF NEW YORK

CONVEYER BUCKET

Application filed January 2, 1930. Serial No. 417,964.

This invention relates to conveyer buckets of the kind particularly adapted for use in connection with wagon loaders and excavators of the type employing an inclined endless conveyer for receiving material at the pick-up end thereof and elevating the same to the discharge end thereof. The invention is particularly directed to improved and reversible digging means for such conveyer buckets, whereby their entering edges may more easily pass into and through the material to be excavated and loaded and whereby the buckets are enabled to effect an appreciable digging action upon such material.

Figure 1 is a side elevation of a portion of the upper reach of an inclined conveyer including conveyer buckets embodying this invention and one of which is broken away at its forward edge or lip for the sake of clearness; Figure 2 is a front view of one of the conveyer buckets of Figure 1, one end of the forward edge or lip of the bucket as well as an intermediate portion of one of the tooth units being broken away for the sake of clearness; and Figure 3 is a plan view of the buckets of Figure 1 showing the staggered relation of the tooth units of one bucket to those of the other.

Referring to the drawings, the numeral 10 indicates fragmentally the upper reach of an endless conveyer of the chain and sprocket type, such as are employed in wagon loaders and excavators, the conveyer including a pair of sprocket chains of which only one is herein shown. To these sprocket chains are suitably connected, as by angle irons 11, a plurality of buckets 12, the vertical flanges of the angle irons serving as link members of the sprocket chains and the other flanges thereof being suitably connected to the bottoms of the respective buckets.

The buckets 12 are each formed with a relatively heavy forward edge or entering lip 13. These lips are each provided with a series of tapered openings 14, which are equidistantly spaced from each other, the openings being illustrated in this particular embodiment of the invention as twelve in number, although the number of such openings may be varied according to requirements.

Upon the lip 13 of each bucket are carried a plurality of tooth units 16, herein shown as three in number. Each of these tooth units includes a pair of teeth 17, which are connected together in a spaced relation by an intermediate connecting portion 18, in which is formed an opening 19 adapted for the reception of an anchor bolt 20 which passes through one of the tapered openings 14, the bolts 20 serving to draw the respective tooth units into firm seating engagement with the lips 13 and there hold the same in place.

Integral with the teeth 17 and connecting portion 18 are tapered shank portions 21 which are adapted to fit the tapered openings 14 and serve as anchoring lugs or elements for the several tooth units, the shank portions 21 being of such size in cross section and of such shape and dimensions with respect to the tapered openings 14 that they serve in themselves as adequate means for preventing lateral displacement of the tooth units in any direction, longitudinal displacement of the tooth units in one direction being prevented by the bolts 20 and in the other direction by reason of the seating engagement of the tooth sections upon the respective lips 13.

Inasmuch as the tapered openings 14 are equidistantly spaced, the teeth sections of one bucket may be staggered with respect to those of the adjacent bucket, as shown in Figure 3, so that one tooth of each tooth section carried by a given bucket is in alignment with the space between the teeth of a corresponding tooth unit of the adjacent bucket, and so that the other tooth of each of the tooth sections of said given bucket register respectively with the spaces afforded between the tooth units of the adjacent bucket. By reason of this staggered arrangement, the material to be loaded or excavated is subjected throughout the width of the conveyer buckets to the digging action of the teeth, regardless of the fact that the teeth of each unit and the tooth units of each bucket are spaced from each other, since the teeth for each bucket occupy positions corresponding to the localities for which no teeth are provided on the adjacent bucket.

By reason of the construction employed in the tooth units herein shown and their relation to the respective lips of the buckets, the tooth units may be easily removed and reversed when the wear becomes excessive on one side thereof or when it is desired to substitute new tooth units. Moreover, by constructing the tooth units with only a comparatively few teeth, the cost of replacement is minimized in the event of breakage of a single tooth, as compared with the cost of replacement were the tooth units made up of a larger number of teeth. Furthermore, by constructing the tooth units with only a comparatively few teeth, the overall length of such units may be kept at a minimum, with the result that a much more intimate seating engagement of the tooth units upon the respective bucket lips may be effected than if such tooth units included a large number of teeth, which would necessitate a greater overall length of each unit.

It will be understood that various changes may be made with respect to the form of invention herein shown and described without departing from the spirit of the invention or the scope of the following claims.

What is claimed is:

1. In combination with a conveyer bucket having a lip provided with a plurality of openings, a plurality of spaced-apart tooth units, each having tooth and shank portions and a connecting portion, said shank portions projecting into said lip openings, and means for holding said tooth units on said lip.

2. In combination with a conveyer bucket having a lip provided with a plurality of openings, a plurality of spaced-apart tooth units, each having tooth and shank portions and a connecting portion, said shank portions projecting into said lip openings, and bolts passing through said connecting portions and through said openings for holding said tooth units on said lip.

3. In combination with a conveyer bucket having a lip provided with a plurality of openings, a plurality of spaced-apart tooth units, each having a pair of spaced-apart teeth and a pair of spaced-apart shank portions and a connecting portion, said shank portions projecting into openings of said lip and bolts passing through said connecting portions and through said openings for holding said tooth units on said lip.

4. In combination with a plurality of conveyer buckets, each having a lip provided with tapered and equidistantly spaced openings, a plurality of spaced-apart tooth units carried by each of said lips, the units carried by the lip of one bucket being staggered with respect to those carried by the lip of an adjacent bucket, each of said units including a pair of teeth having tapered shank portions located in certain of said tapered openings, the teeth of each unit being spaced apart and those of each unit carried by the lip of one bucket being offset with respect to those of corresponding units carried by the lip of the adjacent bucket, a connector plate connecting the teeth of each tooth unit, and a bolt passing through the respective connector plates and through openings intermediate those into which the shank portions of the respective tooth units project for securing said units in position upon the lips of the respective buckets.

In testimony whereof, I have affixed my signature to this specification.

WILLIAM H. BOSWORTH.